April 15, 1924.
E. G. HERBERT
APPARATUS FOR SHARPENING SAWS
Filed June 24, 1922
1,490,668
5 Sheets-Sheet 1
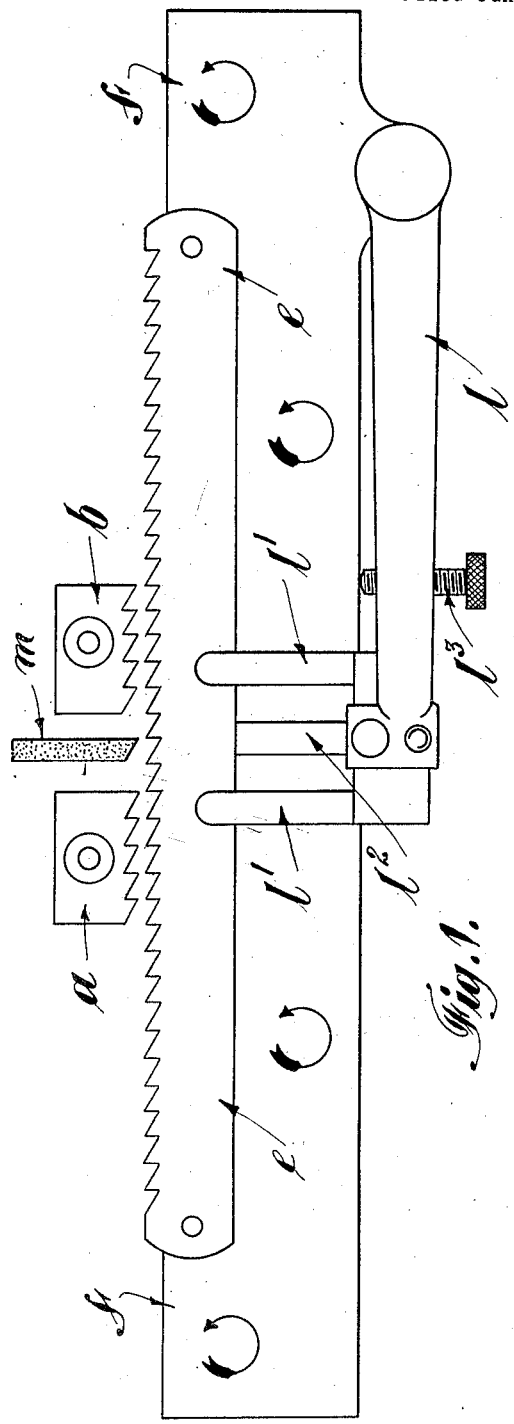
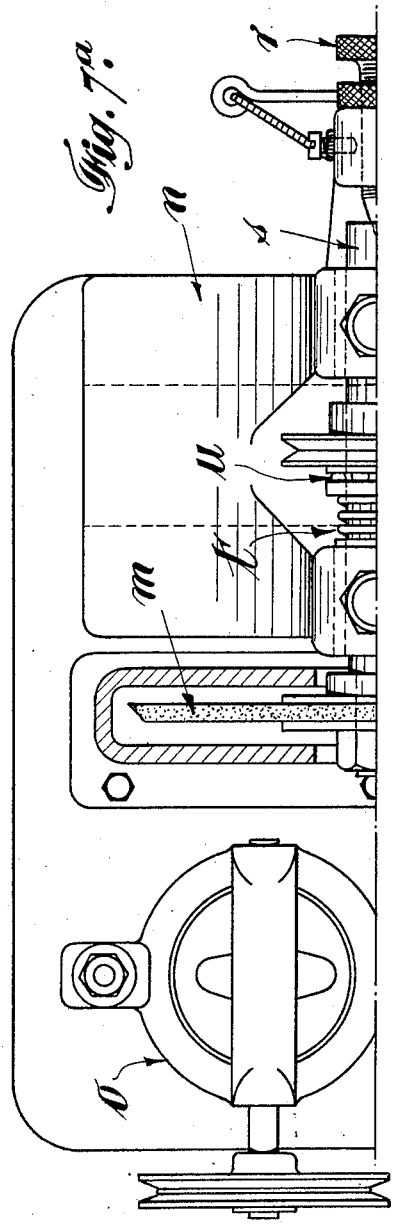
Inventor:
Edward Geisler Herbert.
By his Attorney: Walter Gunn April 15, 1924.                          1,490,668
E. G. HERBERT
APPARATUS FOR SHARPENING SAWS
Filed June 24, 1922      5 Sheets-Sheet 2
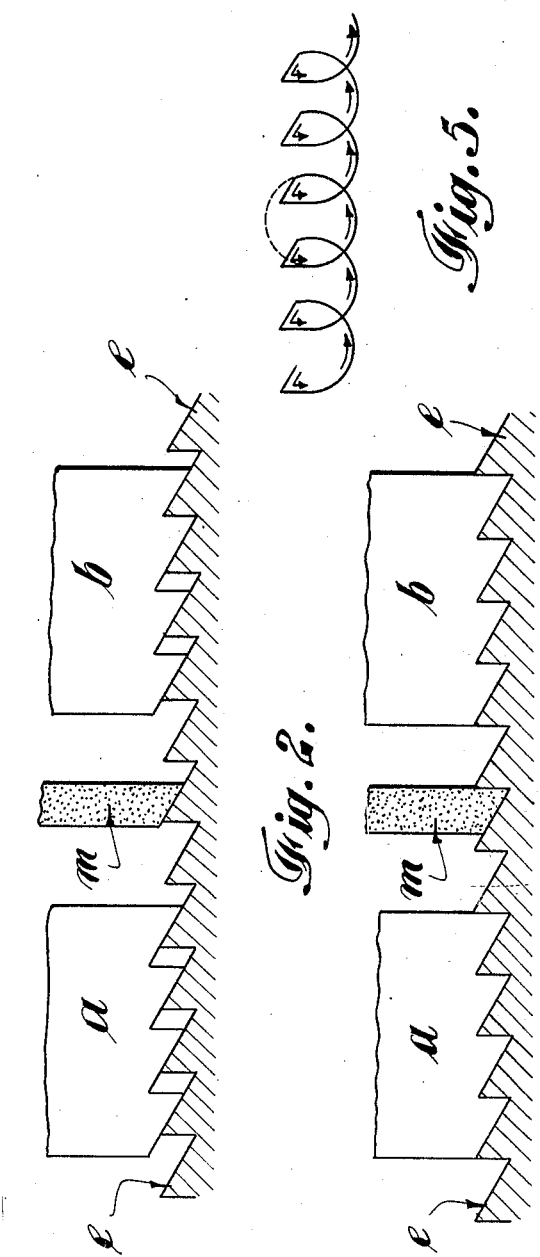
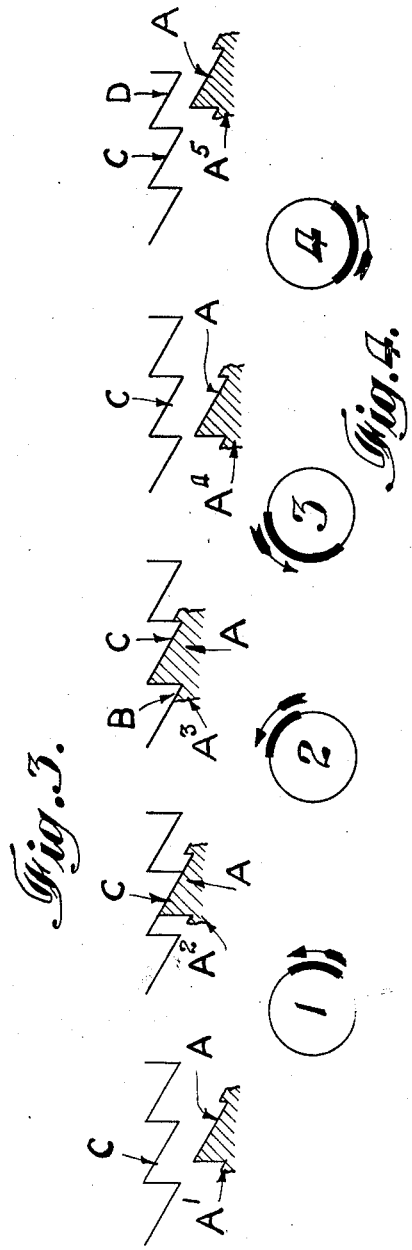
Inventor:
Edward Geisler Herbert.
By his Attorney: Walter Gunn April 15, 1924.

E. G. HERBERT 1,490,668

APPARATUS FOR SHARPENING SAWS

Filed June 24, 1922

Inventor:-
Edward Geisler Herbert.

By his Attorney:- Walter Gunn

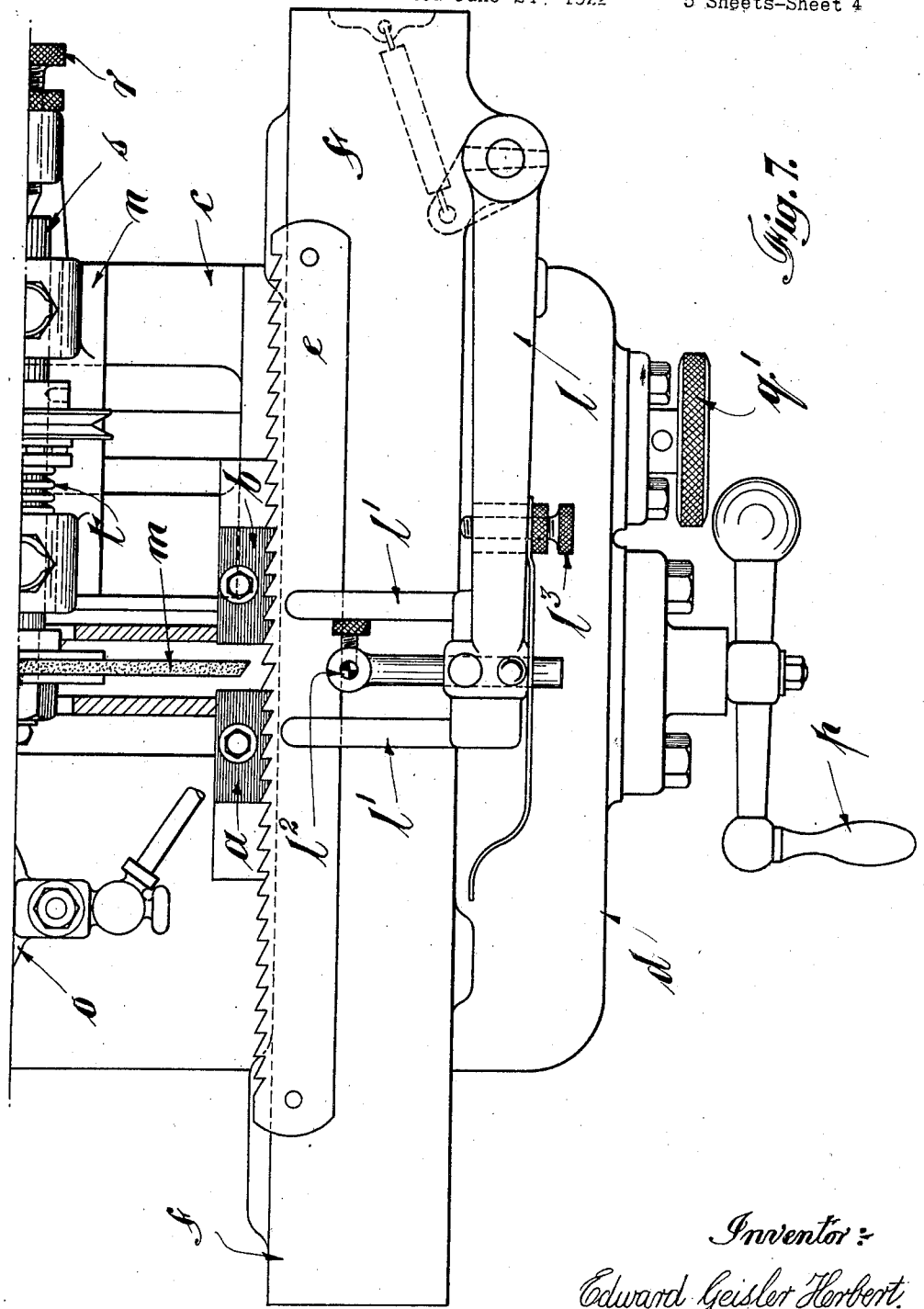

April 15, 1924. 1,490,668
E. G. HERBERT
APPARATUS FOR SHARPENING SAWS
Filed June 24, 1922   5 Sheets-Sheet 5
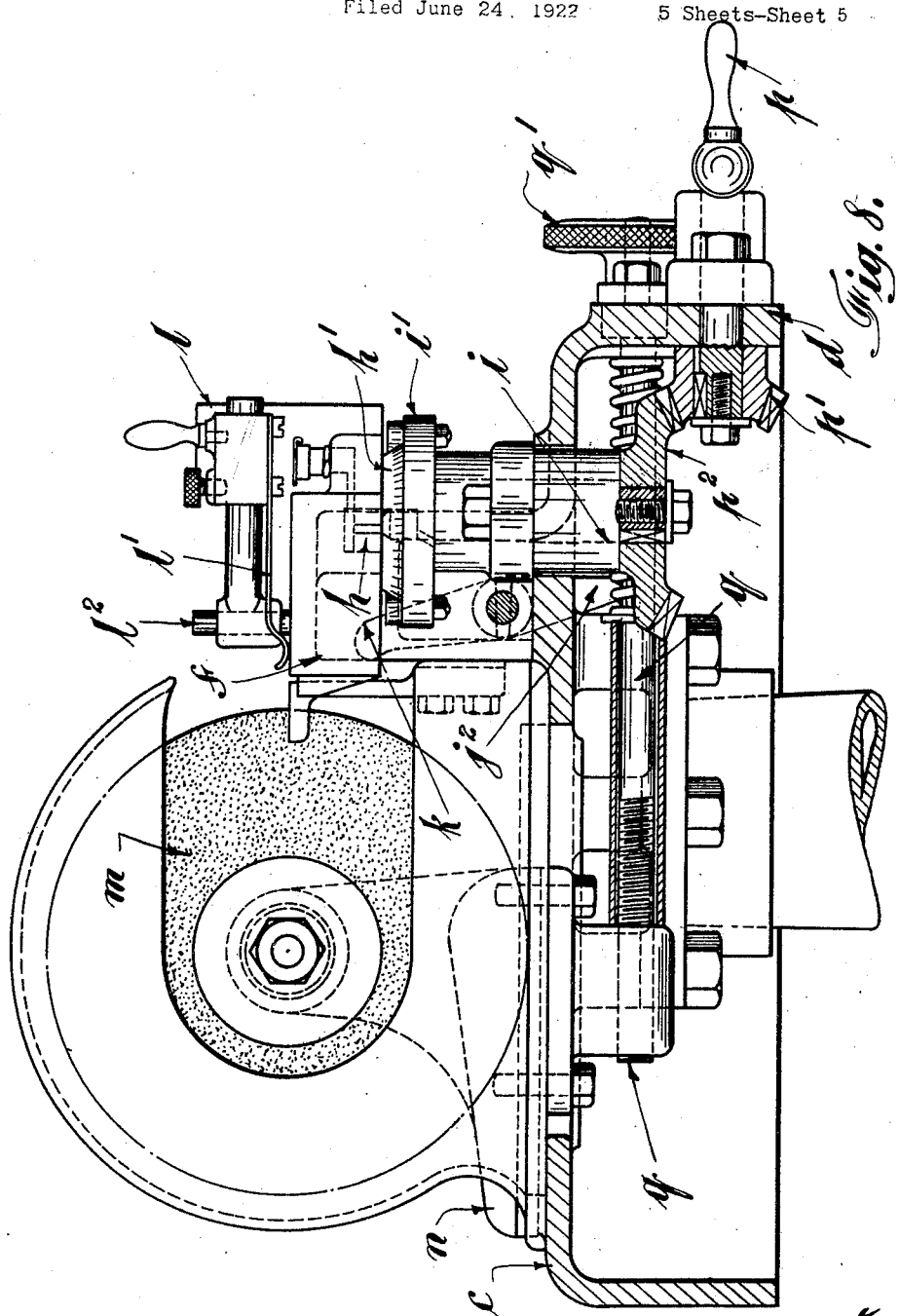
Inventor:
Edward Geisler Herbert
By his Attorney: Walter Gunn Patented Apr. 15, 1924.

1,490,668

UNITED STATES PATENT OFFICE.

EDWARD G. HERBERT, OF LEVENSHULME, MANCHESTER, ENGLAND.

APPARATUS FOR SHARPENING SAWS.

Application filed June 24, 1922. Serial No. 570,587.

*To all whom it may concern:*

Be it known that I, EDWARD GEISLER HERBERT, a subject of the King of Great Britain and Ireland, residing at Levenshulme, Manchester, England, have invented new and useful Improvements in Apparatus for Sharpening Saws, of which the following is a specification.

This invention relates to a new or improved method of and means for sharpening saws, and in particular hack saws and other straight (as distinct from circular) saws. The object of the invention is to sharpen the teeth of a saw in such a manner as to allow of the teeth being repeatedly sharpened without altering their original shape, and further, to sharpen them in a manner which ensures of both the back and front edges of the teeth being sharpened at one operation, thereby restoring the keen cutting edge with a minimum removal of the substance of the saw, the usual method of sharpening saw teeth being to sharpen the backs of the teeth only and to remove more metal than is otherwise necessary.

According to the invention, use is made of two flat metal strips each having one straight serrated edge and conveniently formed of pieces of saw blade with the serrations or teeth exactly similar in pitch and shape to the original teeth of the saw to be sharpened. Such strips, which constitute patterns or guides, are rigidly fixed on a support or table with their serrated edges in line with each other but separated by a gap, the disposition being that which would obtain if a single length of saw were clamped to the table and a central portion containing several teeth were then removed, the relative positions of the teeth on the two remaining portions being unaltered.

A saw blade being placed in contact with the two serrated strips, its teeth (being reversed in direction) will mesh exactly with the teeth on the said strips, but one or more teeth of the saw will lie opposite the gap between the two strips. A suitable bevelled grinding wheel is caused to revolve in a slot in the table and in the gap between the two strips in such a position that its bevelled edge corresponds in position and in shape to one of the teeth in the missing or imaginary portion of the strips, and the edge of the wheel will contact with the back of one of the saw teeth and also with the front of the adjacent teeth exactly as one of the teeth on the missing or imaginary portion of the strips would have contacted. The effect of this arrangement is that no matter how the blunt saw is placed with its reversed teeth in contact with the teeth of the two fixed strips, the edge of the grinding wheel will make contact with a tooth of the blunt saw and will sharpen such tooth, but always preserving its shape which will be similar to the shape of the teeth on the two strips, which are similar in shape to the original teeth of the saw to be sharpened.

In proceeding to sharpen a blunt saw, the saw is first laid flat on the table and its teeth moved into contact with the teeth on the strips, one of its teeth touching the grinding wheel. The saw is then moved along the surface of the table with a sliding motion, the backs of its teeth always being in contact with the backs of the teeth on the strips, and the back of one of its teeth touching and being ground by the grinding wheel. This motion is continued until the teeth of the saw are completely in mesh with the teeth of the strips in which position not only the backs but also the front faces of the saw teeth are in contact with the front faces of the teeth on the strips, and the front face of one tooth of the saw is in contact with the grinding wheel and is sharpened thereby. The motion is repeated with each successive tooth, the saw being moved in the direction of its length one tooth at a time until all the saw teeth, or such of them as were blunt, have been sharpened.

The invention will be more particularly described by the aid of the accompanying drawings, in which:—

Fig. 1 shows somewhat diagrammatically to a magnified scale the essential elements of a machine for sharpening hack saw blades according to this invention, a blade being shown in position ready to commence.

Figs. 2 and 3 show the commencement and finish of the actual grinding operation of a tooth.

Fig. 4 shows diagrammatically to a magnified scale the four positions of the eccentric for traversing the saw and the position of the saw teeth relatively to the guide plates for a complete cycle of movement in grinding one tooth and feeding the next tooth forward.

Fig. 5 is a diagram of the path traversed by each tooth.

Figure 6:
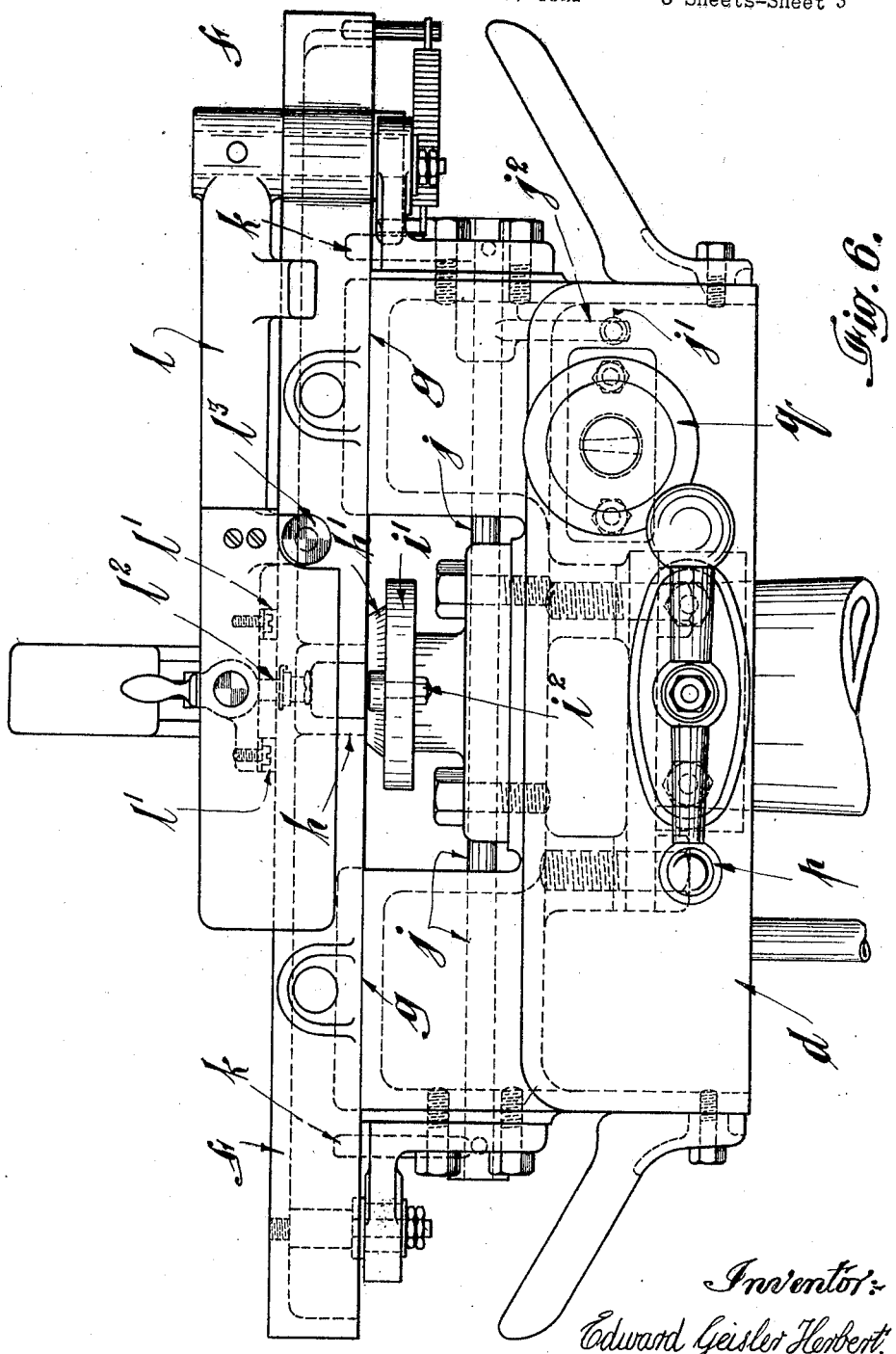
Fig. 6 is a front elevation of a complete machine constructed according to the invention.

Figs. 7 and 7ª are collectively a plan of Figure 6, and

Fig. 8 is a side elevation partly in section.

The saw to be sharpened may be moved against the serrated strips and endwise by hand, but it will preferably be moved by mechanical means operated by hand power, or operated automatically by motive power. In one example of a machine suitable for the purpose, the two serrated strips $a$, $b$ are fixed on a rigid slotted table $c$, or on two tables with a gap between them and rigidly connected to the frame $d$ of the grinding machine and with the grinding wheel between the two strips. The saw $e$ to be sharpened is placed upon a further table $f$ which is movable on the sliding surfaces $g$ formed on the frame $d$ and is capable of having imparted to it a rotary or gyratory and, usually a circular motion in its own plane. The nature of this motion is such that the longitudinal axis of the table always remains parallel to a given line, but every point on the table describes a small circle whose diameter is greater than the pitch of the teeth of the saw to be sharpened, but less than double that pitch. The circular motion is imparted to the table $f$ by means of an eccentric $h$ secured to a shaft $i$ revolving about an axis perpendicular to the surface $g$ and having a bearing on the table $f$ and the throw of the eccentric may be varied by suitable means to suit saws with finer or coarser pitch of teeth. This can be conveniently effected by mounting the eccentric $h$ on a graduated dial $h^1$ eccentrically mounted on the flanged top $i^1$ of the shaft $i$, the bolts $i^2$ serving to lock the dial $h^1$ in the set position with the eccentric $h$ in the required position relative to the centre of the shaft $i$.

To maintain the longitudinal axis of the table always parallel with the said given line, which corresponds with the line of the serrated edges of the two strips $a$ and $b$, a shaft or rod $j$ is pivotally mounted in the supports or bed $d$ on which the table $f$ slides, said rod $j$ being parallel to the serrated edges of the two strips $a$ and $b$ and having on either end a pawl or projection $k$ adapted to bear against appropriate surfaces formed on the table $f$, a spring $j^1$ attached to a crank arm $j^2$ tending to cause the rod $j$ to turn about its axis causing the said projections $k$ to press against the surfaces on the two ends of the table $f$ simultaneously and thereby maintain the longitudinal axis of the table parallel to the rod $j$ and to the serrated strips $a$ and $b$, the table being otherwise free to pivot about the eccentric $h$.

Pivotally mounted on the table $f$ is a spring-actuated lever $l$ carrying two spring blades $l^1$, $l^1$ adapted to hold the saw $e$ lightly on the table $f$ and a projection or stud $l^2$ adapted to bear against the back edge of the saw $e$ and to press the saw into mesh with the serrated strips $a$ and $b$.

The pivotal motion of the lever $l$ is limited by an adjustable stop $l^3$ bearing against the edge of the table $f$.

The grinding wheel $m$ which is bevelled on its periphery is mounted on a head $n$ with compound screw adjustment, and a pump $o$ may be provided to supply cooling liquid.

The action of the mechanism is as follows: The fixed serrated strips $a$ and $b$ have their teeth pointing towards the operator and with the front edges to the right of the teeth, the saw is placed on the movable table $f$ with its teeth pointing away from operator and in the reverse direction to the teeth on the serrated strips. On circular motion being imparted to the table $f$ such motion, and of the saw $l$ lying on it, is in a left-handed or counter-clockwise direction seen from above.

The movements of the saw will be understood from Figure 4 in which $A^1$ to $A^5$ represents one tooth of the saw in five successive positions. B, C, D, represent three consecutive teeth of one of the guides, and the circles 1, 2, 3, 4 represent the motion of the table on which the saw $e$ is supported.

Starting with the saw tooth in the position $A^1$ the table $f$ moves in the direction indicated by the thickened portion of circle 1 and carries the saw with it until the tooth A comes into contact with the back of the guide tooth C as shown at $A^2$. (At this point one of the saw teeth comes into contact with the grinding wheel.) The table $f$ continues its circular motion as shown by the thickened portion of circle 2 and carries the saw with it, but the saw can no longer follow the circular motion of the table, since the backs of its teeth are now in contact with the guide teeth and can only follow that component of the circular motion which lies in the direction of the surfaces in contact. Tooth A therefore, slides over tooth C as seen at $A^2$ until it is completely in mesh as at $A^3$. The table $f$ continues its circular motion (circle 3) but the saw $e$ cannot follow its motion to the left since the front faces of its teeth are stopped by the front faces of the guide teeth. The front face of $A^3$ is now in contact with front face of B. During this phase of the table's motion the saw dwells stationary, allowing the table to slide under it, and during the period of dwell the grinding wheel is sharpening the front face of the saw tooth with which it is in contact. As the motion of the table (circle 3) merges from a leftward into a backward motion the saw begins again to move with the table, the front faces of its teeth sliding over the front faces of the guide teeth until the position $A^4$ is reached, the saw being quite clear of the guide. The last phase is shown by circle 4. The table and saw now move to the right a distance equal to say one and a quarter times the pitch of the teeth. Saw tooth A now approaches model tooth D as at $A^5$. The saw has moved one tooth to the right, and the cycle of motions is repeated until all the teeth have been ground.

It remains to explain the function of lever $l$ and stop screw $l^3$. This lever is pivoted at one end on the table; its other end bears against the blade $e$ and tends to press it towards the guides. The function of lever $l$ is to hold the blade in contact with the guides during that half of the stroke of the table in which grinding takes place, and to allow the blade to move with the table during the other half of its stroke while the blade is being fed forward to the next grinding position. The precise point in the circular motion of the table at which the lever $l$ ceases to hold the blade $e$ against the guides is determined by the setting of the stop screw $l^3$. As the table moves away from the guides (circle 3, Figure 4) it arrives at a point where it comes into contact with the point of the stop screw $l^3$. As the table continues its backward motion it carries the lever bodily with it. The table, the lever and the blade then move together but have no movement relative to each other until the blade comes into contact with the guides again when the spring pressure of the lever on the blade comes into play again. The table moves away from the stop screw $l^3$ while the lever holds the blade against the guides and the blade moves in the direction of the tooth surfaces in contact, under the combined influences of the lever $l$ pressing it against the guides and of the friction of the table on which it is lightly held by springs.

The path described by any point on the blade is illustrated by Figure 7, this apparently complicated cycle of motions being induced by a simple circular motion of the table.

The angle between the guides and the grinding wheel may be perpendicular or oblique, in the latter case enabling the faces of the teeth of the saw to be sharpened at an angle other than a right angle to the longitudinal axis of the saw.

The grinding wheel $m$ may be interchangeable with wheels of varying width to suit the pitch of teeth to be sharpened. The motion of the table $f$ may be obtained by means of a hand wheel or hand lever $p$, adapted to rotate the eccentric $h$ through bevel wheels $p^1$, $p^2$ or said eccentric $h$ may be driven by a power shaft under the control of suitable clutch mechanism, or fast and loose belt pulleys.

The grinding wheel $m$ will preferably be capable of adjustment towards the saw by an amount sufficient to effect the desired sharpening and also to compensate for the wear of the wheel, and this can be conveniently effected by the screw $q$ operated by the hand wheel $q^1$. Lateral adjustment of the grinding wheel on the headstock may be effected by means of the centre screw $r$, the wheel axle $s$ being adjusted longitudinally against the pressure of the spring $t$ and the ball bearing or like anti-friction bearing $u$ being interposed to take the thrust.

Usually the serrated strips $a$ and $b$ will be portions of a new saw blade, and will therefore be readily provided, and will be readily changed to suit the size of tooth to be sharpened, but they may be specially milled guide strips.

What I claim is:—

1. Means for sharpening hack saws and other straight saws, comprising in combination, a grinding wheel, guides having teeth similar in pitch to those of the saw to be sharpened and of the correct angle for efficient cutting, said guides being rigidly fixed one on either side of said grinding wheel in position relatively to each other and to the grinding wheel, such that when a saw blade is presented to the guides its teeth mesh with the teeth on the guides while the grinding wheel simultaneously meshes with one of the saw teeth, substantially as described.

2. Means for sharpening hack saws and other straight saws, comprising guides having teeth similar in pitch to those of the saw to be sharpened and of the correct angle for efficient cutting, said guides being rigidly fixed one on either side of a grinding wheel in position relatively to each other and to the grinding wheel, such that when a saw blade is presented to the guides its teeth mesh with the teeth on the guides while the grinding wheel simultaneously meshes with one of the saw teeth, means being provided for traversing the teeth and for moving the saw, in the direction of its length, until all the saw teeth have been successively traversed along said paths in contact with the grinding wheel, substantially as herein described.

3. Apparatus for sharpening hack saws and other straight saws, comprising in combination, a grinding wheel and guides mounted on a bed, the guides having teeth similar to the teeth of the saw to be sharpened and being rigidly fixed to the bed on both sides of the grinding wheel, a bed having a sliding surface, a table on said sliding surface to receive the saw and means to position the saw on the table together with means to traverse the table so that every point on its surface describes a small circle while the table itself remains parallel to the guides, substantially as described.

4. Apparatus for sharpening hack saws and other straight saws, comprising in combination, a grinding wheel and guides mounted on a bed the grinding wheel being shaped on its periphery to agree substantially with the back of one tooth and the front face of the next succeeding tooth and the guides having teeth similar to the teeth of the saw to be sharpened and being rigidly fixed to the bed on both sides of the grinding wheel, a bed having a sliding surface, a table on said sliding surface to receive the saw and means to position the saw on the table together with means to traverse the table so that every point on its surface describes a small circle while the table itself remains parallel to the guides, substantially as described.

5. Apparatus for sharpening hack saws and other straight saws, comprising in combination, a grinding wheel and guides mounted on a bed, the grinding wheel being shaped on its periphery to agree substantially with the back of one tooth and the front face of the next succeeding tooth and being mounted so as to be adjustable transversely of and perpendicular to the front faces of the guides, said guides having teeth similar to the teeth of the saw to be sharpened and being rigidly fixed to the bed on both sides of the grinding wheel, a bed having a sliding surface, a table on said sliding surface to receive the saw and means to position the saw on the table together with means to traverse the table so that every point on its surface describes a small circle while the table itself remains parallel to the guides, substantially as described.

In testimony whereof I have signed my name to this specification.

EDWARD G. HERBERT.